United States Patent
Rehman et al.

(10) Patent No.: US 10,327,107 B2
(45) Date of Patent: Jun. 18, 2019

(54) DETERMINING THAT A CLIENT DEVICE PRESENTS IN A SITE USING FREQUENT CLIENT MOBILITY PATTERNS

(71) Applicant: Aruba Networks, Inc., Sunnyvale, CA (US)

(72) Inventors: Ataur Rehman, Uttar Pradesh (IN); Manaswini Lakshmikanth Sugatoor, Bangalore Karnataka (IN); Manas Sharma, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/614,129

(22) Filed: Jun. 5, 2017

(65) Prior Publication Data

US 2018/0352384 A1  Dec. 6, 2018

(51) Int. Cl.
*H04W 4/02* (2018.01)
*H04W 4/029* (2018.01)
(Continued)

(52) U.S. Cl.
CPC .............. *H04W 4/029* (2018.02); *G01S 5/02* (2013.01); *G01S 5/0252* (2013.01);
(Continued)

(58) Field of Classification Search
CPC ... H04W 4/029; H04W 4/028; H04W 64/003; H04W 4/02; G01S 5/0252; G01S 5/0284
See application file for complete search history.

(56) References Cited

U.S. PATENT DOCUMENTS 8,478,290 B2   7/2013  Yoeii
8,600,674 B1 * 12/2013  Barbeau ................ H04W 4/029
                                             701/524
(Continued)

FOREIGN PATENT DOCUMENTS

WO    2017/043746 A1    3/2017

OTHER PUBLICATIONS

Unknown, "AirDefense Services Platform Proximity & Analytics Configuration Guide", Zebra, ZIH Corp., 2015, 47 pages.
(Continued)

*Primary Examiner* — Nathan A Mitchell
(74) *Attorney, Agent, or Firm* — Hewlett Packard Enterprise Patent Department

(57) ABSTRACT

Example method includes: receiving, by a network device, a plurality of signal strength values associated with a particular timestamp corresponding to a particular client device from a plurality of access points in a wireless network at a site; determining a mobility pattern based on the plurality of signal strength values associated with the particular timestamp corresponding to the particular client device; comparing the mobility pattern associated with the particular timestamp corresponding to the particular client device with mobility patterns associated with other timestamps or corresponding to other client devices to identify a set of frequent mobility patterns; determining whether an unassociated client device exhibits a threshold number of frequent mobility patterns for a threshold amount of time; and determining that the unassociated client device presents in the site in response to the unassociated client device exhibiting the threshold number of the frequent mobility patterns for the threshold amount of time.

16 Claims, 6 Drawing Sheets

(51) Int. Cl.
  *G01S 5/02* (2010.01)
  *H04W 64/00* (2009.01)
  *H04W 8/00* (2009.01)

(52) U.S. Cl.
  CPC ......... *H04W 8/005* (2013.01); *H04W 64/003* (2013.01); *G01S 5/0284* (2013.01); *H04W 4/02* (2013.01)

(56) References Cited

U.S. PATENT DOCUMENTS

| | | | |
|---|---|---|---|
| 9,426,627 B1 | 8/2016 | Logan et al. | |
| 9,465,746 B2 | 11/2016 | Pandey | |
| 2013/0005381 A1* | 1/2013 | Turkka | H04W 64/006 455/517 |
| 2013/0226655 A1* | 8/2013 | Shaw | G06F 17/5009 705/7.29 |
| 2013/0262184 A1 | 10/2013 | Jain et al. | |
| 2014/0187270 A1 | 7/2014 | Zinin et al. | |
| 2014/0221014 A1* | 8/2014 | Li | H04W 4/028 455/456.3 |
| 2014/0357295 A1* | 12/2014 | Skomra | H04W 4/02 455/456.1 |
| 2015/0346313 A1 | 12/2015 | Smith et al. | |
| 2016/0189170 A1* | 6/2016 | Nadler | G06Q 30/02 705/26.1 |
| 2016/0269984 A1 | 9/2016 | Hallett et al. | |
| 2016/0345163 A1 | 11/2016 | Monaghan et al. | |
| 2017/0111760 A1 | 4/2017 | Shen et al. | |
| 2017/0132305 A1* | 5/2017 | Wang | G06Q 30/02 |
| 2017/0213436 A1* | 7/2017 | Stout | G08B 21/0423 |
| 2017/0219679 A1* | 8/2017 | An | G01S 5/0215 |
| 2017/0236347 A1* | 8/2017 | Drako | H04W 4/029 340/5.33 |
| 2018/0102961 A1* | 4/2018 | Emmanuel | H04L 45/02 |
| 2018/0108242 A1* | 4/2018 | Wilkinson | H04W 4/029 |
| 2018/0197196 A1 | 7/2018 | Cho et al. | |

OTHER PUBLICATIONS

European Search Report and Search Opinion Received for EP Application No. 18175828.5, dated Aug. 13, 2018, 14 pages.

* cited by examiner

EXTRACTED MOBILITY
PATTERNS
270

| CLIENTS 280 | MOBILITY PATTERNS 290 |
|---|---|
| Client 1 | Pattern1→ { AP1_R1=[-60, -65], AP1_R2=[-80, -85], AP2_R1=[-80, -85], AP3_R1=[-70, -75] }<br>Pattern2→ { AP3_R1=[-80, -85], AP3_R2=[-70, -75] }<br>Pattern3→ { AP2_R1=[-65, -70], AP2_R2=[-95, -100], AP3_R1=[-75, -80] }<br>Pattern4→ { AP1_R1=[-65, -70], AP2_R1=[-55, -60], AP2_R2=[-90, -95], AP3_R1=[-70, -75], AP3_R2=[-90, -95] } |
| Client 2 | Pattern1→ {AP2_R1=[-75, -80], AP3_R1=[-70, -75]}<br>Pattern2→ {AP1_R1=[-65, -70], AP1_R2=[-80, -90], AP3_R2=[-90, 95]} |
| Client 3 | Pattern1→ { AP1_R1=[-60, -65], AP1_R2=[-80, -85], AP2_R1=[-80, -85], AP3_R1=[-70, -75] }<br>Pattern2→ { AP2_R1=[-65, -70], AP2_R2=[-95, -100], AP3_R1=[-75, -80]}<br>Pattern3→ {AP3_R1=[-70, -75], AP3_R1=[-95, -100]} |
| Client 4 | Pattern1→ {AP2_R1=[-75, -80], AP3_R1=[-70, -75]}<br>Pattern2→ { AP1_R1=[-65, -70], AP2_R1=[-55, -60], AP2_R2=[-90, -95], AP3_R1=[-70, -75], AP3_R2=[-90, -95] }<br>Pattern3→ { AP1_R1=[-65, -70], AP2_R2=[-55, -60],<br>Pattern4→ { AP2_R1=[-65, -70], AP2_R2=[-95, -100], AP3_R1=[-75, -80]}<br>Pattern5→ → {AP2_R1=[-75, -80], AP3_R1=[-70, -75]}<br>Pattern6→ {AP2_R1=[-80, -85], AP3_R2=[-70, -75]} |

*FIG. 2B*

MODEL
300

(

FREQUENT MOBILITY    {AP1_R1= [-60, -65], AP1_R2= [-80, -85], AP2_R1= [-80, -85], AP3_R1= [-
PATTERN 310          70, -75]},

FREQUENT MOBILITY    {AP2_R1= [-65, -70], AP2_R2= [-95, -100], AP3_R1= [-75, -80]},
PATTERN 320

FREQUENT MOBILITY    {AP2_R1= [-75, -80], AP3_R1= [-70, -75]},
PATTERN 330

FREQUENT MOBILITY    {AP1_R1= [-65, -70], AP2_R1= [-55, -60], AP2_R2= [-90, -95], AP3_R1= [-
PATTERN 340          70, -75], AP3_R2= [-90, -95]}

DETERMINING THAT A CLIENT DEVICE PRESENTS IN A SITE USING FREQUENT CLIENT MOBILITY PATTERNS

BACKGROUND

Presence analytics generally refers to a mechanism for analyzing user traffic patterns in public venues and enterprise environments. Based on the analysis, businesses can develop or improve strategies for customer engagement, maximizing revenue opportunities, optimizing workspace, and increasing market presence.

BRIEF DESCRIPTION OF THE DRAWINGS

The following detailed description references the drawings, wherein:

FIG. 2B is a block diagram of an example mobility patterns extracted from input data for determining that a client device presents in a site using frequent client mobility patterns;

FIG. 3 is a block diagram of an example model used to determine that a client device presents in a site using frequent client mobility patterns;

DETAILED DESCRIPTION

Presence analytics may be implemented in a network application executed by a network device that can periodically gather signal strength values of client devices from access points in a wireless network, and provide client devices' presence information as relative to a geographical site (e.g., whether a particular client device is a pass-by device or a visitor of the site). The site may refer to a geographical coverage area that a group of access points collectively provide wireless network service for. A pass-by client device may refer to a client device that is detected within the vicinity of an access point in the wireless network, but whose signal strength is not strong enough to be classified as presented within the site.

In many instances, the network device running the presence analytics classifies a client device's presence information statically based on signal strength of the signals received from the client device by an access point in the wireless network. Such static classification may be inaccurate to determine the actual presence information of the client devices.

Examples described herein include a method for determining that a client device is present in a site using frequent client mobility patterns. The method can determine whether a particular client device is inside or outside of a site based on frequent mobility patterns exhibited by client devices in the site, if the particular client device has been detected within the vicinity of an access point in a wireless network for a period of time. The site may refer to a geographical coverage area that is serviced by a group of access points (APs) in the wireless network, e.g., a store, a conference room, a lobby area, etc. Periodically, the access points can report the signal strength values of the wireless signals that each access point receives from client devices, as well as the association status of each client device. Using these input data, the network device running the presence analytics can build a model, which includes the mobility patterns (or trails) of associated client devices. Here, an example mobility pattern may be the received signal strength indicator (RSSI) values of a client device reported by single AP or multiple APs with a given timestamp. Next, the network device running the presence analytics can analyze and select a set of most frequent mobility patterns exhibited by associated client devices using closed frequent set mining technique. Once the model is built, the network device running the network device running the presence analytics can match a new client device's mobility patterns with the patterns in the model. If the new client device shows at least two patterns from the model for a predetermined amount of dwell time, the network device running the presence analytics can determine that the new client device presents in the site.

Figure 1:
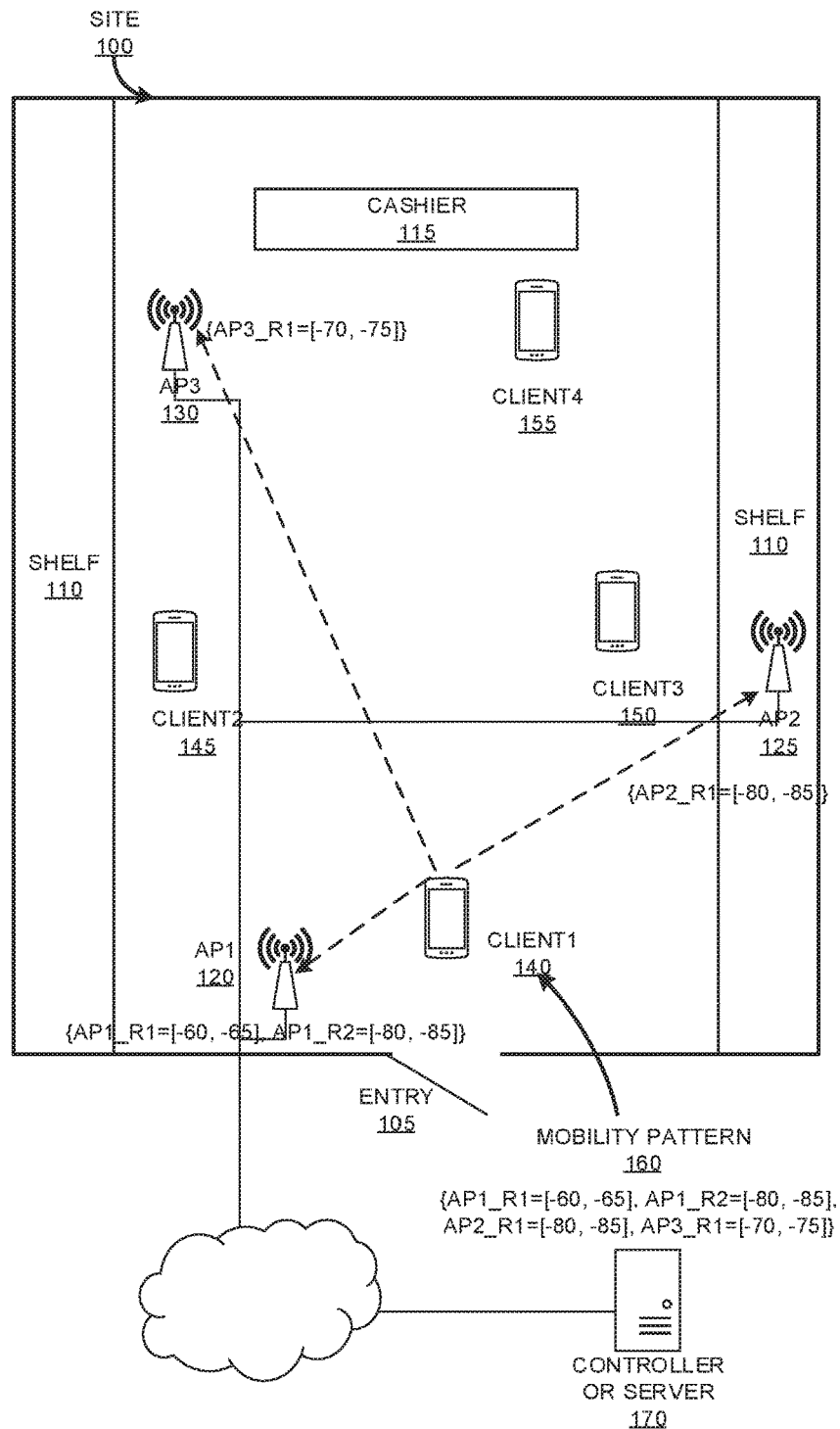
FIG. 1 is a block diagram of an example system environment for determining that a client device presents in a site using frequent client mobility patterns.

FIG. 1 is a block diagram of an example system environment for determining that a client device presents in a site using frequent client mobility patterns. FIG. 1 includes an example site 100 deployed with a plurality of access points (APs), such as, AP1 120, AP2 125, and AP3 130. The plurality of APs may be connected to a controller or server 170. In some examples, the controller or server 170 may be located remotely and connected to the plurality of APs via a cloud infrastructure. In other examples, the controller or server 170 may be located locally and connected to the APs via wired and/or wireless connections. In addition, FIG. 1 includes a plurality of client devices, such as, Client1 140, Client2 145, Client3 150, and Client4 155. Some of these client devices may be associated with the wireless network serviced by the APs (e.g., AP1 120 to AP3 130). Some of these client devices may not be associated with any of the APs in site 100. In addition, some of the client devices 140-155 may be presented within the site, whereas some of the client devices 140-155 may be presented within the vicinity of the site but outside the site (e.g., outside entry 105 but closely located to AP1 120). Also, some of the client devices 140-155 may be moving from time to time, whereas some of the client devices 140-155 may be immobile.

For illustration purposes only, FIG. 1 includes an example floor plan layout of site 100. In this example, site 100 includes two separate shelves (e.g., shelf 110) on each side of the site after a respective client device moves through entry 105 into site 100. Shelf 110 may be used to display goods to customers of site 100. Also, site 100 may include a cashier counter 115, where customers can check out the goods that they want to purchase.

Note that in this example, customers can frequently exhibit certain mobility patterns or trails. For example, many customers may follow the mobility trail of passing through the single entry of site 100, i.e., entry 105, spending some time on either side of shelf 110, then arriving at cashier 115 to check out the goods they've selected. In order to detect these frequent mobility patterns (or trails) of client devices that are presented within site 100, each access point in site 100 can periodically report the signal strength values of the wireless signals received from a client device, as well as the association status of each client device.

For example, when Client1 140 just enters site 100 through entry 105, wireless signals from Client1 140 may be received by all three APs in site 100 at the same time. Specifically, the first radio of AP1 120 may detect a RSSI value of −63 from Client1 140, and the second radio of AP1 120 may detect a RSSI value of −83 from Client1 140. Then, AP1 120 will determine a signal strength value band that corresponds to the detected RSSI value. For example, the RSSI value of −63 falls within the [−60, −65] band, whereas the RSSI value of −83 falls within [−80, −85] band. Next, AP1 120 can report a mobility pattern of Client1 120 as detected by its two radios. In the given example, the mobility pattern reported by AP1 120 includes {AP1_R1=[−60, −65], AP1_R2=[−80, −85])}. Similarly, AP2 125 may report the mobility pattern of Client1 140 as {AP2_R1=[−80, −85] }, and AP3 130 may report the mobility pattern of Client1 140 as {AP3_R1=[−70, 75] }. Note that, although RSSI is used in the above examples, the network device running the presence analytics can use any signal strength metric, including but not limited to, signal-to-noise ratio (SNR), Effective Isotropic Radiated Power (EIRP), etc.

When controller or server 170 receives the mobility patterns of Client1 140 reported by AP1 120 to AP3 130, controller or server 170 can aggregate these mobility patterns based on their timestamps. Specifically, controller or server 170 can combine mobility patterns of the same client device at the same timestamp but reported by different APs in the same site into a single mobility pattern. In the above example, controller or server 170 can combine the mobility patterns of Client1 140 into mobility pattern 160 {AP1_R1= [−60, 65], AP1_R2=[−80, −85], AP2_R1=[−80, −85], AP3_R1=[−70, −75] }.

If Client1 140 subsequently associated with one of the APs in site 100, then the network device running the presence analytics can determine that Client1 140 is presented within site 100. If a respective client device is determined to be presented within site 100, the network device running the presence analytics can add the collected mobility patterns of the respective client device as input data to build and/or update a model. In some examples, the respective client device is determined to be located within a site if the dwell time corresponding to the respective client device is greater than a threshold amount of time (e.g., 5 minutes). Here, the dwell time may refer to the time difference between when the respective client device is detected for the first time and the last time by any AP in a site.

Figure 2A:
FIG. 2A is a block diagram of an example input data received by presence analytics at a network device for determining that a client device presents in a site using frequent client mobility patterns.

FIG. 2A is a block diagram of an example input data received by presence analytics at a network device for determining that a client device presents in a site using frequent client mobility patterns. In this example, input data 200 includes data received from AP1 210, AP2 220, and AP3 230, and each AP has two different radios (e.g., AP1 210 has R1 212 and R2 214; AP2 220 has R1 222 and R2 224; AP3 230 has R1 232 and R2 234). Also, client ID 240 identifies a client device whose wireless signal strength values are reported by the APs in the wireless network. Moreover, timestamp 250 indicates the time when the APs in the wireless network report the signal strength values of the wireless signals received from the client device. Further, associated 260 is a field that indicates whether the client device is currently associated with the wireless network.

There can be multiple levels of data filtering and data manipulation being performed on input data 200. Specifically, input data 200 can be processed to filter the dataset. For example, if a particular record has missing values from all three APs, the record can be removed from input data 200. As another example, input data 200 may be filtered based on whether the client device is associated or unassociated with the wireless network to create different input datasets.

Also, input data 200 can be processed to remove outliers. For example, the system can remove any single radio records, or two radio records seen on the same AP. Removal of single radio records help avoid the outlier patterns to be considered in the model, because APs located in the corners or near doorway can hear client devices that may be outside the site.

The example input data 200 in FIG. 2A includes three records. The first record shows that client device with ID #4, which was associated with the wireless network, was detected at the timestamp 1478564238 by R1 212 and R2 214 of AP1 210, R2 224 of AP2 220, and R1 232 of AP3 230. The second record shows that client device with ID #4, which was associated with the wireless network, was detected at the timestamp 1478564298 by R2 214 of AP1 210, R1 222 and R2 224 of AP2 220, and R2 234 of AP3 230. The third record shows that client device with ID #5, which was associated with the wireless network, was detected at the timestamp 1478564298 by R1 212 of AP1 210, R2 224 of AP2 220, and R1 232 of AP3 230.

Each radio reports a RSSI value band based on the RSSI value of the signals received from the client device. For example, if the RSSI of the signal from the client device is −63, then the band [−60, −65] is reported and included in input data 200. The band [−60, −65] represents that the reported RSSI value falls between −60 and −65. The interval of 5 in each band allows for accurate determination of the distance between the client device and the AP. Meanwhile, it also allows for recognition of frequent common mobility patterns exhibited by client devices in the wireless network. When client devices move along with the same trail in a site, their signals as detected by the APs may exhibit the same mobility patterns using signal strength band having an interval of 5.

FIG. 2B is a block diagram of an example mobility patterns 270 extracted from input data 200 for determining that a client device presents in a site using frequent client mobility patterns. Specifically, FIG. 2B lists example client devices 280 and their mobility patterns 290. For example, Client 1 shows four different mobility patterns at different timestamps. In pattern 1, signals from Client 1 were received at a first timestamp and reported by R1 of AP1 as [−60, −65], R2 of AP1 as [−80, −85], R1 of AP2 as [−80, −85], and R1 of AP3 as [−70, −75]. In pattern 2, signals from Client 1 were received at a second timestamp and reported by R1 of AP3 as [−80, −85] and R2 of AP3 as [−70, −75]. In pattern 3, signals from Client 1 were received at a third timestamp and reported by R1 of AP2 as [−65, −70], R2 of AP2 as [−95, −100], and R1 of AP3 as [−75, −80]. In pattern 4, signals from Client 1 were received at a fourth timestamp and reported by R1 of AP1 as [−65, −70], R1 of AP2 as [−55, −60], R2 of AP2 as [−90, −95], R1 of AP3 as [−70, −75], and R2 of AP3 as [−90, −95]. Similarly, Client 2 shows two different mobility patterns at two different timestamps; Client 3 shows three different mobility patterns at three different timestamps; and, Client 4 shows six different mobility patterns at six different timestamps.

Next, by comparing the mobility patterns corresponding to different client devices that are collected at different timestamps, the system can determine a subset of mobility patterns that occur more than once among all mobility patterns 290. For example, pattern 1 of Client 1 and pattern 1 of Client 3 are the same mobility pattern. Also, pattern 3 of Client 1, pattern 2 of Client 3, and pattern 4 of Client 4 are the same mobility patterns. Moreover, pattern 4 of Client 1 and pattern 2 of Client 4 are the same mobility patterns. Furthermore, pattern 1 of Client 2, pattern 1 and pattern 5 of Client 4 are the same mobility patterns. Here, it is assumed that all four client devices are associated with the wireless network. Therefore, the system can generate a set of frequent mobility patterns exhibited by associated client devices. The frequent mobility patterns, for example, can include the client devices' mobility pattern trails whose counts are more than a predetermined count (e.g., occurring more than once).

FIG. 3 is a block diagram of an example model used to determine that a client device presents in a site using frequent client mobility patterns. Model 300 includes the four frequent mobility patterns 310-340 generated by analyzing input data 200 in FIG. 2. Specifically, frequent mobility pattern 310 is exhibited as pattern 1 of Client 1 and pattern 1 of Client 3. In addition, frequent mobility pattern 320 is exhibited as pattern 3 of Client 1, pattern 2 of Client 3, and pattern 4 of Client 4. Moreover, frequent mobility pattern 330 is exhibited as pattern 1 of Client 2, pattern 1 and pattern 5 of Client 4. Further, frequent mobility pattern 340 is exhibited as pattern 4 of Client 1 and pattern 2 of Client 4.

In some examples, the system use data collected from moving client devices to build the model. By including moving client devices, the system can remove static client devices that may skew the distribution of frequent mobility patterns. Such static client devices may be desktop computers at the cashier or security devices. In these cases, moving client devices may be determined based on which radio detected the maximum RSSI value from the client device at a given timestamp. For example, with mobility patterns 290 in FIG. 2B, R1 of AP1 was the radio detecting the maximum RSSI value [−60, −65] at the first timestamp; R2 of AP3 was the radio detecting the maximum RSSI value [−70, −75] at the second timestamp; R1 of AP2 was the radio detecting the maximum RSSI value [−65, −70] at the third timestamp; and, R1 of AP2 was the radio detecting the maximum RSSI value [−55, −60] at the fourth timestamp. Therefore, during the periods when these mobility patterns were reported, the radio that detected the maximum signal strength from Client 1 has changed from R1 of AP1 to R2 of AP3, then to R1 of AP2. Such continuous change in the radio that detects the maximum signal strength from a particular client device indicates that the particular client device is a moving client device. Thus, the system can determine that a particular client device is moving if the radio detecting the maximum signal strength has changed for a threshold number of times during a predetermined time period. For example, if the radio detecting the maximum RSSI from a client device changes more than 3 times in 10 consecutive records in the input data, then the respective client device is determined to be a moving client device. As a result, the records of the respective client device in the input data are used for closed frequent mobility pattern data mining.

In some examples, the system can look for a maximum RSSI value from each row in the input data (e.g., input data 200 in FIG. 2) and determine a radio name corresponding to the maximum RSSI value. Then, the system can add the maximum RSSI value and the maximum RSSI detecting radio to input data as new metrics. Next, the system can filter records of each client device and compute its dwell time. For example, if signals from that client device are detected continuously for at least 10 minutes and the client device is determined to be a moving client device, then the system can add the records of that client device to the moving client device's record dataset. After filtering client devices' records, the resulting moving client devices' record dataset can be used to build the model.

When building the model, the input data is divided into two separate sets, e.g., a training dataset and a validation dataset, according to a predetermined ratio (e.g., 80% of input data belong to the training dataset, whereas 20% of input dataset belong to the validation dataset). The training dataset may be used for model training purposes. On the other hand, the validation dataset may be used for validating the model after the model is built.

Subsequently, the system can convert the moving client devices' record dataset from the training dataset into transactions to compute most common mobility patterns using FP-Close dataset mining. FP-Close dataset mining mines frequent patterns that are both closed and have support greater than or equal to the minimum support. Here, the minimum support may be determined by domain expert as per requirement. A pattern may be referred to as "closed" in a set of patterns if no superset of patterns has the same support count as this original pattern. The FP-Close dataset mining can efficiently find the closed frequent set. The closed frequent set can remove redundant mobility patterns from the frequent mobility patterns set. Thus, frequent mobility patterns obtained in the model are unique.

In some examples, frequent mobility patterns 310-34 can be obtained using closed frequent set mining. Here, the closed frequent set is defined as a frequent item set that is both closed and its support is greater than or equal to the minimum support (also known as "minsup"). An item set is closed in a dataset if there exists no superset that has the same support count as this original item set. To identify the closed frequent set, the system first can identify all frequent item sets. Then, from this group of frequent item sets, the system can find those that are closed by checking to see if there exists a superset that has the same support as the frequent item set. If there is, the item set is disqualified. However, if no superset can be found, then the item set is determined to be closed. In some examples, the system can first identify the closed item sets, and then use the minsup to determine which ones are frequent.

Closed frequent item sets and maximal frequent item sets may be subsets of frequent item sets, whereas maximal frequent item sets are a more compact representation because it is a subset of closed frequent item sets. Closed frequent item sets are used herein for illustration purposes, but other alternatives (e.g., maximal frequent item sets) may be used in the data mining as well.

Once the model is built, the system can match a new client device's mobility patterns with the existing frequent mobility patterns in the model. If at least two patterns get matched, then the system can determine a dwell time for the new client device during which the matched mobility pattern is exhibited. Dwell time may refer to the time difference between when a client device is detected for the first time and the last time by any AP in a network. If the dwell time is greater than a predetermined threshold (e.g., 5 minutes), then the system can determine that the new client device is located inside the site.

After the model is built, the system can further verify the validity of the built model. As mentioned previously, a certain ratio of the input data are used for validation purposes. To validate the model, the system can first find the moving client devices in the validation dataset using the same mechanism as described above (e.g., by determining whether the radio that detects the maximum RSSI of signals from a client device changes over time). Then, the system can match the mobility patterns of each moving client device with frequent mobility patterns in the model. If at least two mobility patterns exhibited by the moving client device match with the frequent mobility patterns in the model and if the moving client device's dwell time is more than a predetermined period of time (e.g., 5 minutes), then that moving client device can be classified as inside the site. If a threshold percentage (e.g., 60%) of client devices' mobility patterns in the validation set match the frequent mobility patterns in the model, then the built model is deemed to have been validated.

Table 1 below shows an example validation results.

TABLE 1

| Unassoc clients | |
| --- | --- |
| Seen for >=3 min | 10000 |
| Seen on >=2 radios | 7054 |
| # patterns matched | 2727 |
| Classified inside (dwell time = 5 mins) | 1609 |
| % of patterns matched to seen on >=2 radios | 22.8% |
| Assoc clients | |
| Seen for >=3 min | 500 |
| Seen on >=2 radios | 262 |
| # patterns matched | 226 |
| Classified inside (dwell time = 5 mins) | 226 |
| % of patterns matched to seen on >=2 radios | 86.2% |

In this example, there are 86.2% of associated client devices' mobility patterns from the validation dataset matching with the frequent mobility patterns in the training dataset, which verifies that selected support of 0.1 is good.

Figure 4:
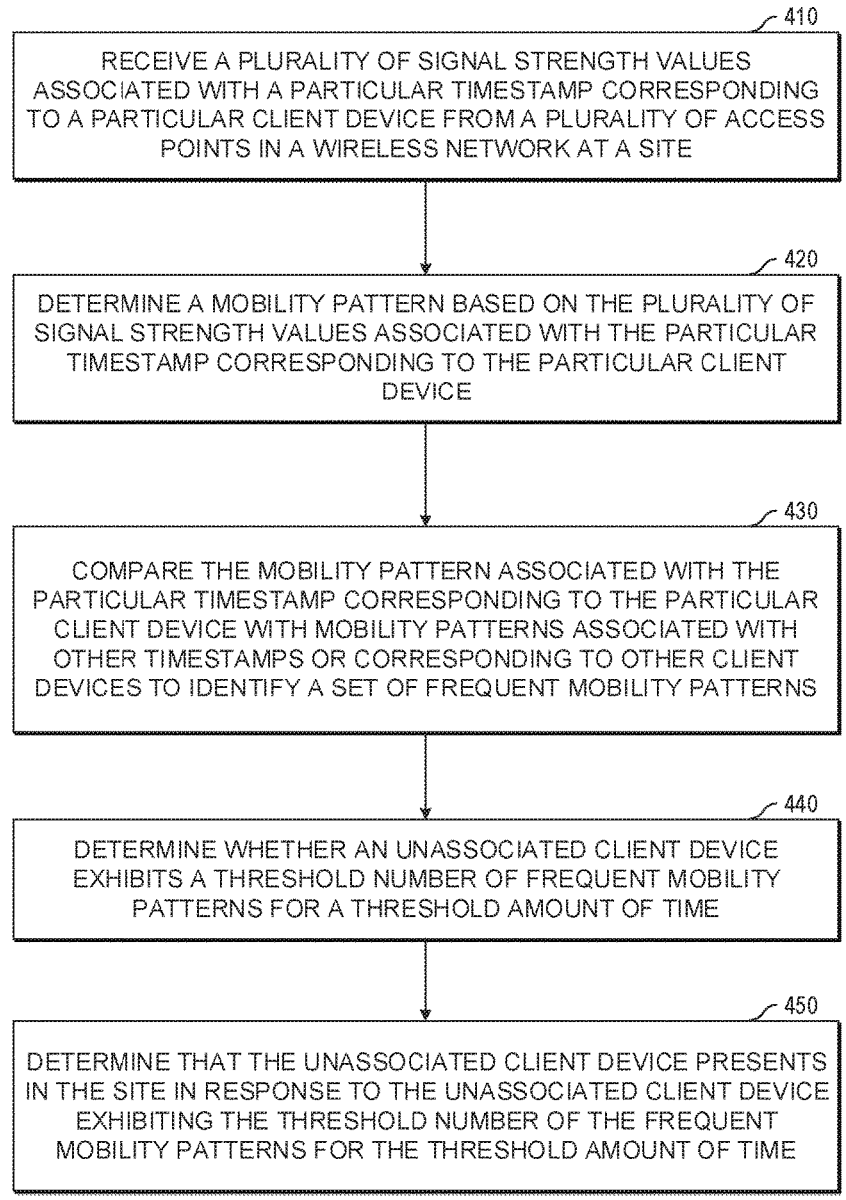
FIG. 4 is a flowchart of an example process of determining that a client device presents in a site using frequent client mobility patterns.

Processes of Determining that a Client Device Presents in a Site Using Frequent Client Mobility Patterns FIG. 4 is a flowchart of an example method (e.g., process) of determining that a client device presents in a site using frequent client mobility patterns. During operations, a network device (e.g., a server or controller) can receive a plurality of signal strength values associated with a particular timestamp corresponding to a particular client device from a plurality of access points in a wireless network at a site (operation 410). Then, the network device can determine a mobility pattern based on the plurality of signal strength values associated with the particular timestamp corresponding to the particular client device (operation 420). Next, the network device can compare the mobility pattern associated with the particular timestamp corresponding to the particular client device with mobility patterns associated with other timestamps or corresponding to other client devices to identify a set of frequent mobility patterns (operation 430). Further, the network device can determine whether an unassociated client device exhibits a threshold number of frequent mobility patterns for a threshold amount of time (operation 440). Moreover, the network device can determine that the unassociated client device presents in the site in response to the unassociated client device exhibiting the threshold number of the frequent mobility patterns for the threshold amount of time (operation 450).

In some implementations, a network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. For example, signal strength values corresponding to client devices that are sent from access points can be received at a network controller. The network controller may then analyze the received information to determine whether a client device is present in a site. In another example, signal strength values corresponding to client devices that are sent from access points can be received at a server computing device, which may then analyze the received information to determine whether a client device is present in a site.

In some examples, the mobility pattern includes the plurality of signal strength values, whereas each signal strength value can be reported by a particular radio of a particular access point in the wireless network at the particular timestamp. In some examples, each signal strength value comprises a non-overlapping range of received signal strength indicator (RSSI) values.

In some examples, the set of frequent mobility patterns occur more than a predetermined number of times among mobility patterns associated with different timestamps corresponding to different client devices in the wireless network.

In some examples, the threshold amount of time includes a dwell time, which indicates a time difference between when the particular client device is detected for the first time and the last time by any access point in the wireless network.

In some examples, the network device can further determine that the unassociated client device is moving in response to a threshold number of changes within a predetermined period of time in an access point radio that detects a maximum signal strength value corresponding to the unassociated client device. In addition, the network device can use closed frequent set mining to build a model that includes the set of frequent mobility patterns. Thereafter, the network device can validate the model in response to a majority of moving client devices matching at least two frequent mobility patterns during a predetermined dwell time.

Network Device to Determine that a Client Device Presents in a Site Using Frequent Client Mobility Patterns As used herein, a network device may be implemented, at least in part, by a combination of hardware and programming. For example, the hardware may comprise at least one processor (e.g., processor 510) and the programming may comprise instructions, executable by the processor(s), stored on at least one machine-readable storage medium (e.g., 520). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Figure 5:
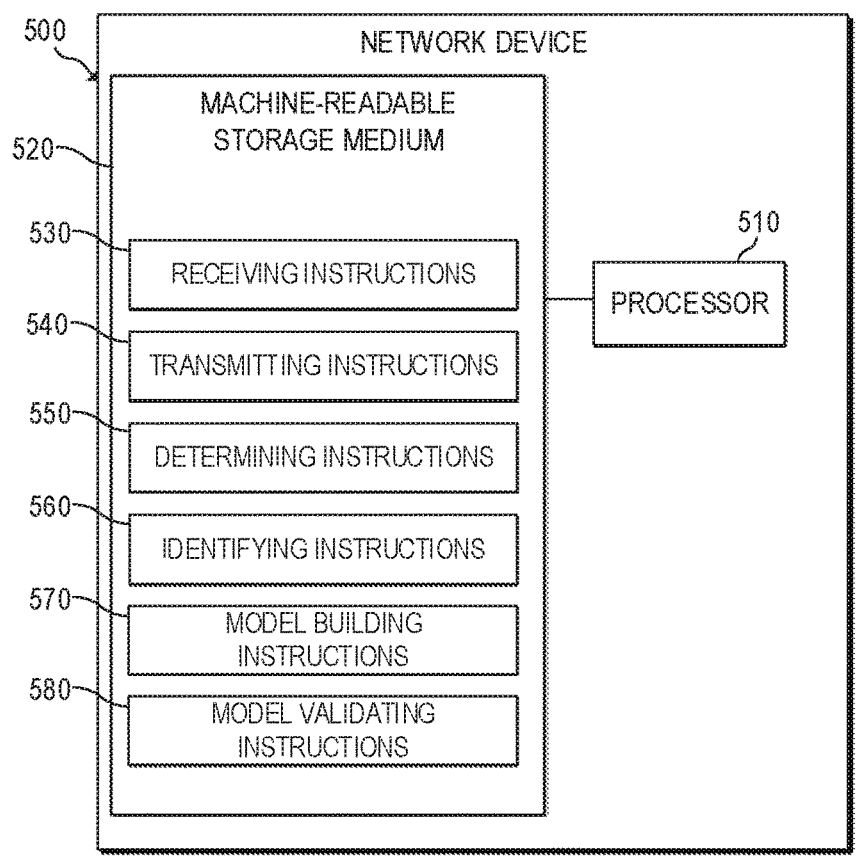
FIG. 5 is a block diagram of an example network device to determine that a client device presents in a site using frequent client mobility patterns.

The at least one processor 510 may fetch, decode, and execute instructions stored on storage medium 520 to perform the functionalities described below in relation to instructions 530-580. In other examples, the functionalities of any of the instructions of storage medium 520 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 5, storage medium 520 may be implemented by one machine-readable storage medium, or multiple machine-readable storage media.

Although network device 500 includes at least one processor 510 and machine-readable storage medium 520, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 530-580 may be executed by processor 510 to: receive a plurality of signal strength values associated with a particular timestamp corresponding to a particular client device from a plurality of access points in a wireless network at a site; determine a mobility pattern based on the plurality of signal strength values associated with the particular timestamp corresponding to the particular client device; compare the mobility pattern associated with the particular timestamp corresponding to the particular client device with mobility patterns associated with other timestamps or corresponding to other client devices to identify a set of frequent mobility patterns; determine whether an unassociated client device exhibits a threshold number of frequent mobility patterns for a threshold amount of time; determine that the unassociated client device presents in the site in response to the unassociated client device exhibiting the threshold number of the frequent mobility patterns for the threshold amount of time; determine that the unassociated client device is moving in response to a threshold number of changes within a predetermined period of time in an access point radio that detects a maximum signal strength value corresponding to the unassociated client device; use closed frequent set mining to build a model that comprises the set of frequent mobility patterns; validate the model in response to a majority of moving client devices matching at least two frequent mobility patterns during a predetermined dwell time; etc.

We claim:

1. A method comprising:
    receiving, by a network device, a plurality of signal strength values associated with a particular timestamp corresponding to a particular client device from a plurality of access points in a wireless network at a site;
    determining, by the network device, a mobility pattern based on the plurality of signal strength values associated with the particular timestamp corresponding to the particular client device;
    comparing, by the network device, the mobility pattern associated with the particular timestamp corresponding to the particular client device with mobility patterns associated with other timestamps or corresponding to other client devices to identify a set of frequent mobility patterns;
    determining, by the network device, whether an unassociated client device exhibits a threshold number of frequent mobility patterns for a threshold amount of time;
    determining, by the network device, that the unassociated client device presents in the site in response to the unassociated client device exhibiting the threshold number of the frequent mobility patterns for the threshold amount of time;
    determining, by the network device, that the unassociated client device is moving in response to a threshold number of changes within a predetermined period of time in an access point radio that detects a maximum signal strength value corresponding to the unassociated client device; and
    using closed frequent set mining, by the network device, to build a model that comprises the set of frequent mobility patterns.

2. The method of claim 1, wherein the mobility pattern comprises the plurality of signal strength values, each signal strength value being reported by a particular radio of a particular access point in the wireless network at the particular timestamp.

3. The method of claim 2, wherein each signal strength value comprises a non-overlapping range of received signal strength indicator (RSSI) values.

4. The method of claim 1, wherein the set of frequent mobility patterns comprises mobility patterns that occur more than a predetermined number of times among mobility patterns associated with different timestamps corresponding to different client devices in the wireless network.

5. The method of claim 1, wherein the threshold amount of time comprises dwell time indicating a time difference between when the particular client device is detected for the first time and the last time by any access point in the wireless network.

6. The method of claim 1, further comprising:
    validating the model in response to a majority of moving client devices matching at least two frequent mobility patterns during a predetermined dwell time.

7. A network device, comprising at least:
    a memory;
    a processor executing instructions from the memory to:
        receive, from a plurality of access points in a wireless network, input data comprising a plurality of signal strength values associated with a plurality of timestamps corresponding to a plurality of client devices at a site;
        generate a plurality of mobility patterns by grouping together the plurality of signal strength values associated with a particular timestamp corresponding to a particular client device;
        identify a set of frequent mobility patterns from the plurality of mobility patterns by counting a number of occurrences for each respective mobility pattern and select the respective mobility pattern to be a part of the set of frequent mobility patterns if the number of occurrences exceeds a predetermined value;
        determine whether an unassociated client device exhibits a threshold number of frequent mobility patterns for a threshold amount of time;
        determine that the unassociated client device presents in the site in response to the unassociated client device exhibiting the threshold number of the frequent mobility patterns for the threshold amount of time;

determine that the unassociated client device is moving in response to a threshold number of changes within a predetermined period of time in an access point radio that detects a maximum signal strength value corresponding to the unassociated client device; and use closed frequent set mining to build a model that comprises the set of frequent mobility patterns.

8. The network device of claim 7, wherein each of the plurality of mobility patterns comprises the plurality of signal strength values, and wherein each signal strength value is reported by a particular radio of a particular access point in the wireless network at a particular timestamp.

9. The network device of claim 8, wherein each signal strength value comprises a non-overlapping range of received signal strength indicator (RSSI) values.

10. The network device of claim 7, wherein the set of frequent mobility patterns comprises mobility patterns that occur more than two times among mobility patterns associated with different timestamps corresponding to different client devices in the wireless network.

11. The network device of claim 7, wherein the threshold amount of time comprises a dwell time indicating a time difference between when the particular client device is detected for the first time and the last time by any access point in the wireless network.

12. The network device of claim 7, wherein the processor further executes instructions from the memory to:

validate the model in response to a majority of moving client devices matching at least two frequent mobility patterns during a predetermined dwell time.

13. A non-transitory machine-readable storage medium encoded with instructions executable by at least one processor of a network device, the machine-readable storage medium comprising instructions to:

receive a plurality of signal strength values corresponding to a plurality of client devices from a plurality of access points in a wireless network at a site;

determine a plurality of mobility patterns based on the plurality of signal strength values corresponding to a particular client device;

identify a set of frequent mobility patterns from the plurality of mobility patterns;

determine that an unassociated client device presents in the site based on the unassociated client device matching a threshold number of frequent mobility patterns for a threshold amount of time;

determine that the unassociated client device is moving in response to a threshold number of changes within a predetermined period of time in an access point radio that detects a maximum signal strength value corresponding to the unassociated client device; and use closed frequent set mining to build a model that comprises the set of frequent mobility patterns.

14. The non-transitory machine-readable storage medium of claim 13, wherein the mobility pattern comprises the plurality of signal strength values, each signal strength value being reported by a particular radio of a particular access point in the wireless network at a particular timestamp; and wherein each signal strength value comprises a non-overlapping range of received signal strength indicator (RSSI) values.

15. The non-transitory machine-readable storage medium of claim 13, wherein the set of frequent mobility patterns comprises mobility patterns that occur more than a predetermined number of times among mobility patterns associated with different timestamps corresponding to different client devices in the wireless network; and wherein the threshold amount of time comprises dwell time indicating a time difference between when the particular client device is detected for the first time and the last time by any access point in the wireless network.

16. The non-transitory machine-readable storage medium of claim 13, wherein the machine-readable storage medium further comprises instructions to:

validate the model in response to a majority of moving client devices matching at least two frequent mobility patterns during a predetermined dwell time.

* * * * *